Oct. 5, 1948.                J. W. BEECHER                2,450,625
                    FLUID PRESSURE RESPONSIVE ELEMENT
                         Filed Nov. 30, 1944
Fig.1.
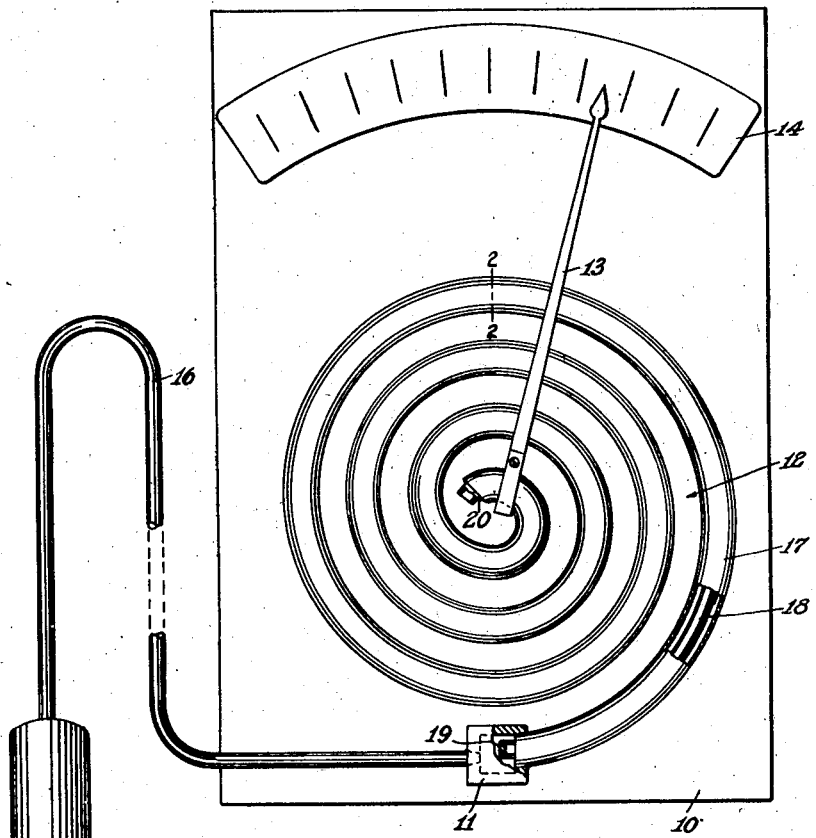
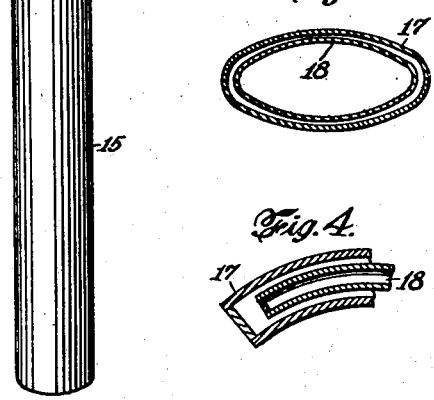
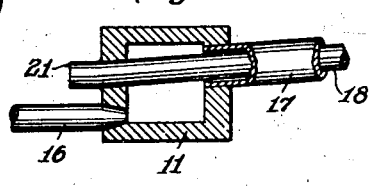
Fig.3.
Fig.4.
INVENTOR.
John W. Beecher
BY
ATTORNEY.

Patented Oct. 5, 1948

2,450,625

UNITED STATES PATENT OFFICE 2,450,625

FLUID-PRESSURE-RESPONSIVE ELEMENT

John W. Beecher, Waterbury, Conn., assignor to The Bristol Company, Waterbury, Conn., a corporation of Connecticut Application November 30, 1944, Serial No. 565,962

6 Claims. (Cl. 73—418)

This invention relates to fluid-pressure-responsive elements of the Bourdon spring class, in which a curved tube of non-circular section is subjected to a fluid-pressure to be measured, and varies its curvature in response to changes in the value of said pressure, and more especially to an element of the above class having a filler, whereby to reduce to a minimum the internal volume in comparison to other physical dimensions. The customary Bourdon spring comprises an extended tubular member formed to a section having preferably an elliptical conformation, curved to a circular, spiral, or helical form, fixed at one extremity and having an extremity free to deflect to a predetermined extent in proportion to changes in an internal fluid-pressure to be measured.

While the design of Bourdon springs involves intricate mathematical computations, it is a well-known fact that in general the power available from a tube operating under a given set of conditions will increase with the transverse cross-sectional area of the tube. It will be apparent, also, that a tube of large dimensions may be deflected to a given extent with less unit stress in the metal walls than for an equivalent tube of small dimensions. Where a Bourdon spring is connected to a sealed bulb to form a closed system for temperature measurement, it will be apparent that the internal pressure in the system will be subject not only to the temperature under measurement, to which the bulb is exposed, but also to that of the Bourdon spring and of the interconnecting tubing. Since the temperature effect will vary with the amount of fluid exposed to the temperature, it follows that in the interest of accuracy the internal volumes of the Bourdon spring and the interconnecting tube should be made as small as possible. Various means have been developed whereby the internal volume of the interconnecting tube may be reduced to a minimum; but these form no part of the present invention, and here require no further consideration.

From the foregoing, it will be observed that the desiderata of large cross-section and small volume in a Bourdon tube are basically incompatible, requiring means extraneous to the basic design in order to effect the two objectives in a common element. This problem has long been known to those versed in the art of fluid-pressure measurement; and various expedients have been adopted with a view to effecting the desired object. These include the insertion in such a tube of various "fillers," including strips of metal or of organic material, bundles of wire, and masses of sand, metallic chips, or powder. For various obvious reasons, these expedients have been found little, if any, practical use in industry.

It is an object of the present invention to provide a Bourdon spring adapted to use in a closed system, and in which the volume of space for the measuring internal fluid shall be small in relation to the effective cross-section area.

It is a further object to provide a Bourdon spring in which the reduction of relative volume shall be effected without undesirable loss of inherent sensitivity.

It is a further object to provide a Bourdon spring of the type hereinbefore noted in which the necessary modification from the conventional structure of such tubes shall be effected by simple means and by the use of standardized types of material.

It is a further object to provide a Bourdon spring of said type in which the means for bringing about the previously listed objects shall not introduce undesirable effects in the form of mechanical friction or "set."

It is a further object to provide means in which there shall be no tendency to clog the passages for the measuring fluid or to contaminate such fluid therein.

In carrying out the purposes of the invention, it is proposed to provide for a Bourdon spring of conventional section, preferably approximating an ellipse, an insert, in the form of a tube, preferably also elliptical, having a cross-section similar to that of the outside tube, but having sufficient clearance therefrom to avoid friction and binding between the juxtaposed surfaces of the inner and the outer tubes, respectively. The intermediate chamber thus provided is sealed and adapted for communication with a source of fluid-pressure to be measured. It is further proposed that the interior of the inner tube shall be open to the atmosphere, whereby to eliminate undesirable resistance to deformation and also temperature effects which might characterize a closed tube.

The nature of the invention, however, will best be understood when described in connection with the accompanying drawings, in which:

Fig. 1 is a front elevation, with portions broken away, of a thermometer system embodying the principles of the invention.

Fig. 2 is a sectional view, to an enlarged scale, taken on the line 2—2, Fig. 1.

Fig. 3 is a fragmentary view, partly in section, of an alternative form of an element of the invention; and Fig. 4 is a detail sectional view illustrating the modification then required in the free extremity of the novel Bourdon spring.

Referring to the drawings, the numeral 10 designates a base plate having mounted thereon a hollow abutment member 11 adapted to support a Bourdon spring 12, constructed in a manner presently to be set forth. The Bourdon spring 12 is coiled, for example, to the form of a spiral and has attached to its free end, to be angularly deflected therewith, an index or pointer 13 adapted to cooperate with a graduated scale 14 which is mounted upon the base plate 10 to provide a measure of the deflected position of said pointer. A metallic bulb 15, in the form of a closed chamber, is connected by means of a small-bore tube 16 to the interior of the Bourdon spring 12, said tube 16 being sealed to an opening in the abutment 11, and forming with the spring 12 a totally enclosed system—all of which is well understood and forms no particular part of the present invention.

The structure of the novel Bourdon spring will be more clearly understood by reference to Fig. 2, wherein a portion of said spring is shown in section and to an enlarged scale. As shown, the spring comprises a tube 17 which is formed of relatively thin resilient metal, and is conformed to a non-circular section, preferably to a substantially elliptical section, in all respects similar to the conventional form of a Bourdon spring. Lying within the tube 17 is a smaller tubular member 18, preferably of material identical with that of the tube 17, and also of substantially elliptical cross-section. The dimensions of the tubular member 18 with respect to those of the tube 17 are so selected that prior to the coiling of the Bourdon spring structure, the former may be slipped within the later without appreciable binding. While it is not necessary that the respective tubes be out of contact with each other on the short axes of the elliptical form, it is imperative, for reasons presently to be set forth, that there be sufficient clearance at the extremities of the long axes that under no condition can the juxtaposed surfaces of said tubes come into contact at these points.

In assembly, the tubular member 18 is slipped into the tube 17 for its whole length, preferably projecting through the latter for a slight distance at one end, Fig. 1. The structure embodying the tube 17 with the tube 18 inside is then curved or coiled in well-known manner about an axis substantially parallel to the long axes of the ellipses representing the sections of said tubes, whereby to constitute a Bourdon spring of conventional form having therein a hollow insert occupying a large proportion of its interior space. The extremity of the tubular member 18 which is juxtaposed to the abutment 11 is closed from communication with the surrounding space as at 19, and the same extremity of the tube 17 is sealed to the abutment 11 with its interior in communication with the interior of said abutment and with the small-bore tube 16 communicating with said interior. At the free extremity of the Bourdon spring, the annular space between the inner and outer tubes is closed, as at 20, and the corresponding protruding extremity of the inner tubular member 18 is left open and in communication with the atmosphere.

Should it be deemed expedient, for any mechanical reason, the inner tubular member 18 may be continued through and secured to the abutment member 11, as indicated in Fig. 3, with its fixed extremity 21 open to the atmosphere, in which case the opposite and free extremity of said tubular member, lying within the corresponding extremity of the outer tubular member 17, would be sealed independently of the tubular member 17 and clear of attachment thereto, as indicated in Fig. 4.

The Bourdon spring as thus constructed comprises a curved elliptical structure formed of two concentric tubular members of similar cross-section having the interspace in communication with the source of pressure to be measured, and the space within the inner tubular member, like that exterior to the structure, at all times at atmospheric pressure. Thus, it will be seen that, while the cross-section of the outer tubular member 17, which is responsible for the operating torque, has in no way been modified, the volume of operating fluid within said tubular member is materially less than the internal volume of an unoccupied member. While, of course, a change in fluid pressure within the space between the two tubular members will exert upon the inner member 18 a force tending to deflect the free end of said tubular member in a sense opposite to the deflection upon the outer tube 17, it has been found that the proportional reduction in total force available, due to the counter effect exerted by member 18 on the deflection, is materially less than that in the desirable reduction effected in internal volume. It will be obvious, moreover, that fluid pressure in the annular space between the tubular sections will at the same time tend to lengthen the major axis of the substantially elliptical inner tube and shorten the corresponding dimension of the outer tube, and that, should the juxtaposed surfaces at the extremities of these axes come into contact, normal deformation will be substantially inhibited, thus defeating the purpose of the invention. Therefore, in the selection of relative dimensions of the tubular elements, there must be allowed between the lengths of the major axes of the respective cross-sections sufficient disparity that an operating clearance will at all times be assured.

A mathematical analysis of the performance of the Bourdon spring involves intricate computation; and, while the relations existing between volume change and deflection in a Bourdon spring formed on the basis of the present invention could be utilized to show that the proportional reduction in effective action is materially less than that in internal volume, it will suffice here to state that tests have shown that, with standard tube sections now commercially available for the constructing of Bourdon springs, it is possible to select inner and outer tubular members of such relative dimensions that with a reduction of internal volume amounting to 90% of the space within the outer member, the negative action of the inner tubular member serves to reduce the sensitivity of the combination by only 10%, thus giving a material net gain in desirable operating characteristics.

I claim:

1. A Bourdon spring comprising a curved tubular member of non-circular cross-section, and a further tubular member surrounded thereby, only partially filling the same and terminally closed with respect to said curved tubular member to provide a chamber therebetween adapted for connection with a source of fluid pressure, the said further tubular member extending beyond a terminal closure of the outer of the members and being open thereat for communication with the atmosphere.

2. The Bourdon spring of claim 1, wherein a hollow abutment is provided for securing one extremity of each of the tubular members, the first-named member terminating at, and being in free communication through its corresponding extremity with, the interior of said abutment, which interior is adapted also for communication with a source of fluid pressure to be measured.

3. The Bourdon spring of claim 1, wherein a hollow abutment is provided for securing one extremity of each of the tubular members, the first-named member terminating at, and being in free communication through its corresponding extremity with, the interior of said abutment, which interior is adapted also for communication with a source of fluid pressure to be measured, and the further tubular member at its said secured extremity passing through the abutment and open beyond the same to the atmosphere.

4. The Bourdon spring of claim 1, wherein a hollow abutment is provided for securing one extremity of each of the tubular members, the first-named member terminating at, and being in free communication through its corresponding extremity with, the interior of said abutment, which interior is adapted also for communication with a source of fluid pressure to be measured, and the further tubular member at its said secured extremity passing through the abutment and open beyond the same to the atmosphere, the unsecured extremities of the respective tubular members being independently sealed and unattached to each other.

5. A Bourdon spring comprising a curved tubular member of non-circular cross-section, and a further tubular member having its principal portion surrounded thereby and displaced therefrom to provide a sealed chamber therebetween, said further tubular member being closed at one extremity and protruding at the opposite extremity beyond an extremity of the first-named tubular member and open to the atmosphere.

6. A Bourdon spring having curvature substantially in a plane and adapted to vary said curvature in response to changes in internal pressure, said spring comprising a tubular member of non-circular cross-section having a short axis substantially in said plane and a long axis substantially perpendicular thereto, a further tubular member within the first-named tubular member of smaller but similar section thereto and terminally closed with respect thereto to provide a chamber between the tubular members, the said further tubular member extending beyond a terminal closure of the outer of the members and being open thereat for communication with the atmosphere, and a tubular means communicating with the chamber between said tubular members to afford communication with a source of fluid pressure to be measured.

JOHN W. BEECHER.

REFERENCES CITED

The following references are of record in the file of this patent:

UNITED STATES PATENTS

| Number | Name | Date |
| --- | --- | --- |
| 883,159 | Fournier | Mar. 24, 1908 |
| 1,322,463 | Nelson | Nov. 18, 1919 |
| 1,685,457 | Lamb | Sept. 25, 1928 |
| 1,984,734 | Fournier | Dec. 18, 1934 |

FOREIGN PATENTS

| Number | Country | Date |
| --- | --- | --- |
| 416,413 | Germany | July 15, 1925 |